B. C. HINMAN & E. W. ROBEY.
APPARATUS FOR DIVIDING LIQUIDS.
APPLICATION FILED APR. 4, 1914.

1,121,246.

Patented Dec. 15, 1914.
4 SHEETS—SHEET 1.

B. C. HINMAN & E. W. ROBEY.
APPARATUS FOR DIVIDING LIQUIDS.
APPLICATION FILED APR. 4, 1914.

1,121,246.

Patented Dec. 15, 1914.

B. C. HINMAN & E. W. ROBEY.
APPARATUS FOR DIVIDING LIQUIDS.
APPLICATION FILED APR. 4, 1914.

1,121,246.

Patented Dec. 15, 1914.
4 SHEETS—SHEET 4.

Fig. 6.

Fig. 7.

WITNESSES
S. C. McBride
R. C. Henry

INVENTORS
Bertrand C. Hinman and
Ernest W. Robey
by Foster Freeman Watson Hart atty

UNITED STATES PATENT OFFICE.

BERTRAND CHASE HINMAN, OF LONDON, AND ERNEST WILLIAM ROBEY, OF SOUTH WOODFORD, ENGLAND.

APPARATUS FOR DIVIDING LIQUIDS.

1,121,246. Specification of Letters Patent. Patented Dec. 15, 1914.

Application filed April 4, 1914. Serial No. 829,648.

*To all whom it may concern:*

Be it known that we, BERTRAND CHASE HINMAN, a citizen of the United States of America, and a resident of London, England, and ERNEST WILLIAM ROBEY, a subject of His Majesty the King of Great Britain, and a resident of South Woodford, Essex, England, have invented a certain new and useful Improvement in Apparatus for Dividing Liquids, of which the following is a specification.

This invention relates to improved means for dividing flowing liquids into two or more streams having a constant volume irrespective of variations in the volume of flow and to means for varying the ratio of such streams from time to time as may be desired.

The accompanying drawings illustrate forms of apparatus by which the desired result may be attained, although such forms may be modified to meet varying circumstances without departing from the nature and scope of the present invention.

Figure 1:
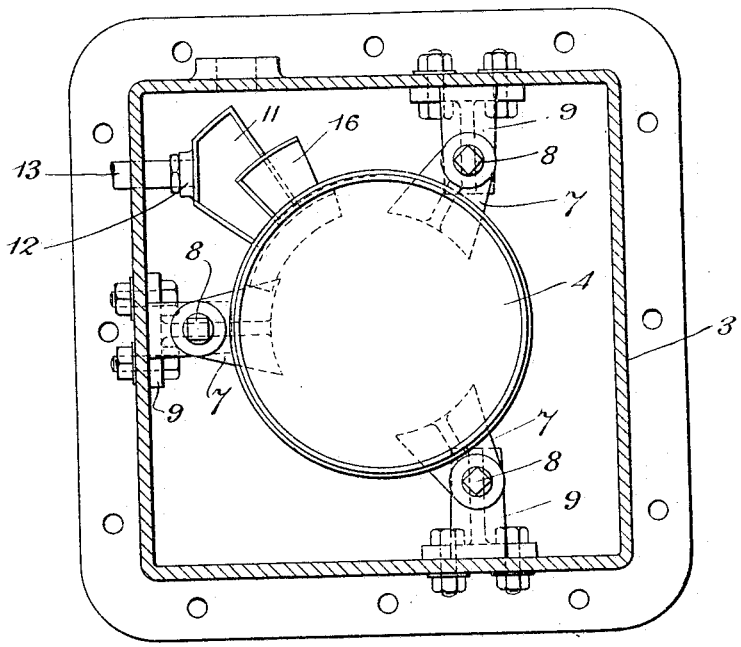
Figure 2:
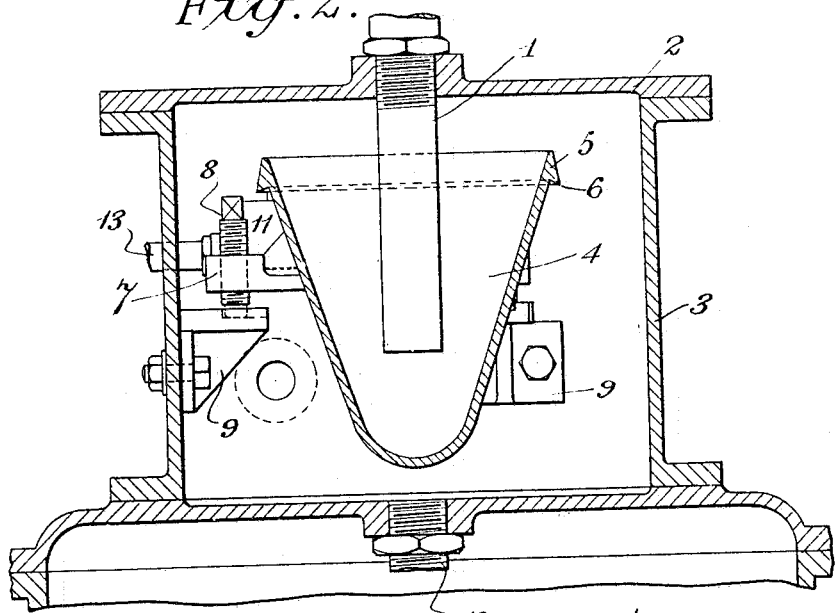
Figure 3:
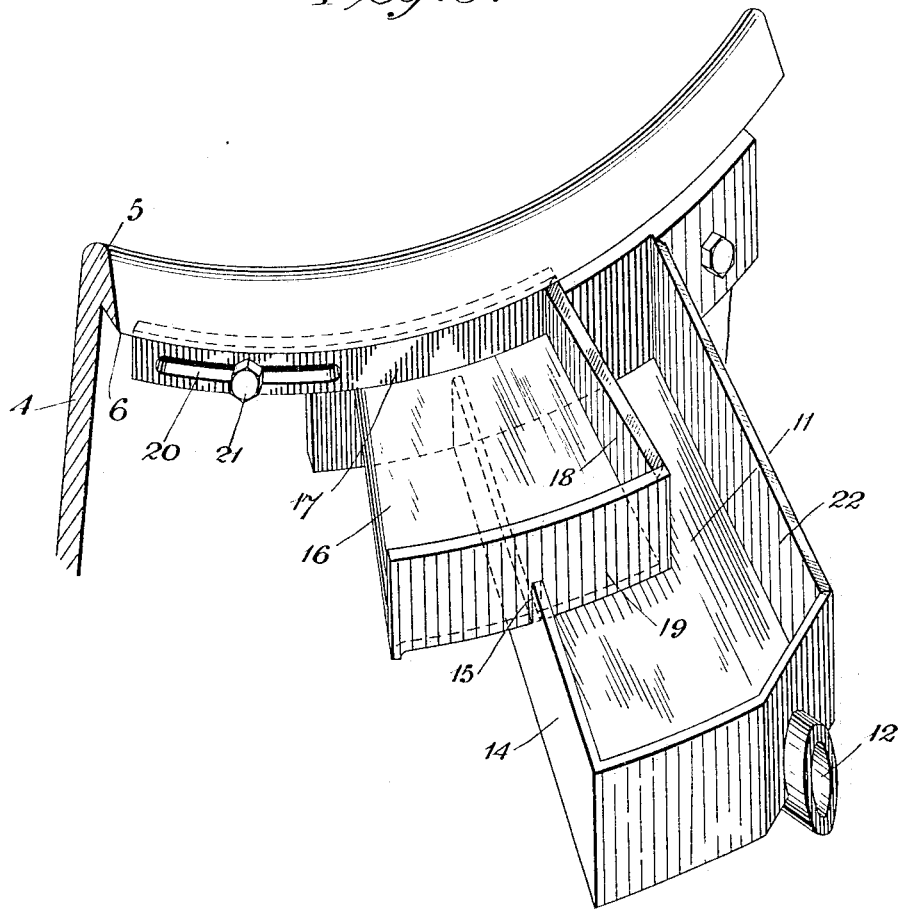
Figure 4:
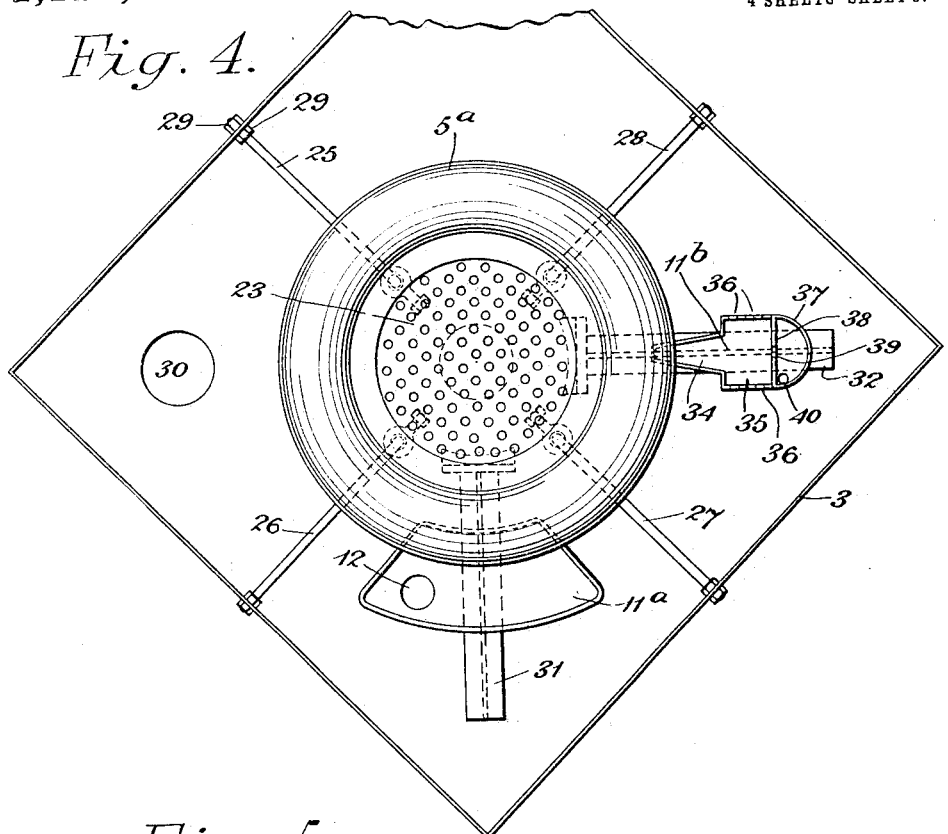

In said drawings: Figure 1 is a plan of one form of apparatus, the cover and inlet pipe shown in Fig. 2 being omitted, the outer walls of the vessel being shown in section. Fig. 2 is a vertical transverse section of Fig. 1, Fig. 3 is a perspective view of a catchment cup, the top walls of part thereof being shaded to show that they are represented as chisel edged. Fig. 4 is a plan of a modified form of apparatus, Fig. 5 is a vertical transverse section of Fig. 4, Fig. 6 is a vertical section of another modified form of apparatus and Fig. 7 is an end view of the brackets which carry catchment cups as hereinafter described one of such cups being shown resting thereon.

As shown in said drawings, Figs. 1 to 3, a water supply 1 extends through a cover 2 of a tank 3 into a conical vessel 4 located within the tank. The vessel 4 the sides of which form a weir, is thickened near the edge to form a rim 5 which is rounded off at the top edge and is under cut to form a sharp lower edge 6. The weir is supported on lugs 7 projecting from the side thereof and drilled and threaded to accommodate vertical set screws 8 which rest on brackets 9 bolted to the sides of the tank. Liquid is delivered through the pipe 1 into the vessel 4 and flows over the top thereof in an even film-like stream into the tank 3 whence it is drawn off through a pipe 10. In order to insure that an even stream will flow over the weir, that is to say, a stream having at any moment a uniform cross-section, it is necessary that the top of rim 5 should be accurately disposed in a horizontal plane and this can be easily effected by adjusting the screws 8. Also, owing to the fact that the delivery edge 6 of the rim 5 is lower than the part immediately preceding it, the liquid is guided in a manner most favorable to obtain an even stream, and is delivered without obstruction into the catchment cup below. Attached to the side of the weir immediately beneath the edge 6 is a catchment cup or receptacle 11 having an outlet 12 that communicates through the wall of the tank 3 by means of a pipe 13. A wall 14 of the cup 11 is cut away at 15 to accommodate an adjustable tray or cover 16 which is supported on the cup. This tray has three side walls 17, 18, 19, the wall 17 being extended laterally. A slot 20 is provided in the extended portion of the wall 17 and a stud bolt 21 passing through said slot is adapted to fix the tray in the desired position. The catchment cup 11 is adapted to intercept a part of the stream of liquid flowing over the weir and the intercepting area of the cup can be varied by adjusting the tray or cover 16 to cover more or less of the cup. In order to prevent splashing of the liquid as it falls into the cup and to insure accurate division, the wall 18 of the tray and a wall 22 of the cup are provided with chisel upper edges. Thus it will be seen that a part (which may be varied) of the total stream is divided off by the catchment cup and that such part bears a constant ratio to the total stream flowing over the weir.

Figure 5:
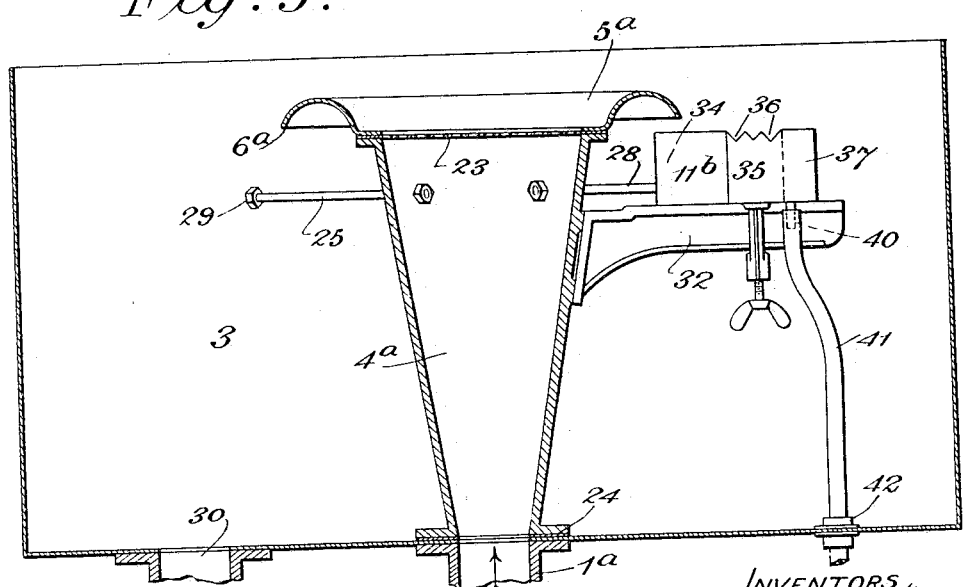

Referring now to Figs. 4 and 5, which illustrate a modification of the apparatus, a hollow cone shaped casting 4ª is mounted to stand vertically in a tank 3 and communicates through a hole in the bottom of the tank with a liquid supply pipe 1ª. Secured to the upper end of the casting 4ª is a curved sheet metal rim 5ª. As shown the curvature is approximately semi-circular in cross section. The liquid flows up through the casting 4ª and over the rim 5ª into the tank 3. In order to prevent the liquid from surging or splashing and to insure a smooth stream a perforated baffle plate 23 is disposed at the mouth of the casting 4ª. The external edge 6ª of the rim 5ª is lower than the upper curved surface thereof and this presents the advantageous feature that the liquid is guided in a manner most suitable to obtain an even stream, and that there is space between the delivering edge and the conical upcast portion for the adjustment of the catchment cups. In order to provide for the accurate adjustment of the rim 5ª in a horizontal plane the casting 4ª is mounted on a compressible packing ring 24, and four radial screw rods 25, 26, 27 and 28, are provided which latter are anchored to the casting 4ª and are adjustably secured to the walls of the tank 3 as by nuts 29. By this means the accurate leveling up of the rim may be effected. The parts thus far described virtually constitute a weir, the liquid flowing into the tank 3 whence it escapes by way of the hole 30. Attached to the wall of the casting 4ª by screw bolts or other well known means not shown is a bracket 31 on which a catchment cup or receptacle 11ª is so slidably mounted as to be capable of adjustment beneath the weir. The adjustment of the position of the cup or receptacle 11ª is usually effected by hand and such cup can be held in the desired position by means of a set screw 52 passing through the yoke 53 attached to the cup and embracing the bracket as most clearly seen in Fig. 7. Owing to the form of the cup 11ª which has sides that are approximately radial to the weir, a greater or less proportion of the total stream will fall or flow into the cup as the latter is moved toward or from the center of the weir. It will be seen that the proportion of liquid that enters the cup 11ª bears the same relation to the total volume of the stream as the width of the cup presented to the stream bears to the circumference of the rim 5ª whatever the position of the cup may be. At right angles to the bracket 31 in the construction shown is a second bracket 32 attached by any suitable means (not shown) to the wall of the casting 4ª and on which a smaller catchment cup 11ᵇ is mounted, adjusted and held in a similar manner to cup 11ª, it being illustrated here as another form of cup and to show the possibility of selecting two streams, having different ratios to the main stream. The cup 11ᵇ has a portion 34 which has side walls on approximately radial lines to the weir and is adapted to enter beneath the stream, a chamber 35 having V shaped notches 36 in the side walls thereof, and a third or final chamber 37 divided from the chamber 35 by a partition 38, in which is another V shaped notch 39. The liquid flows from the rim 5ª into the portion 34 and chamber 35 where it is sub-divided, one portion passing through the notches 36 into the tank and the other portion passing through the notch 39 in the partition 38 into the chamber 37 where it is drawn off by way of the opening or pipe 40, which is connected by the flexible pipe 41 to the outlet 42. In this way a very small proportion of the total stream may be drawn off or divided and the proportion which the subdivided stream bears to the whole stream may be readily adjusted by moving the cup to or from the weir as previously described. The subdivision of the liquid effected in the cup may be varied to suit the convenience of the case by increasing or decreasing the number or capacity of the notches 36 and 39 in the sides of the chamber 35 and the partition 38, provided always that their apices are in the same horizontal plane. The catchment cups may take various shapes provided that they are adapted to extend along a greater or less distance of the stream as they are moved to or from the latter.

Referring to Fig. 6 which illustrates diagrammatically another modified form of the apparatus, the casting 4ª has a number of inwardly projecting arms 43 which support the lower end of a vertical spindle 44, the upper end of which is supported by a spider bracket 45. On the spindle 44 is a sleeve 46 which is free to rotate thereon and which carries two arms 47, 48. The arm 47 supports a catchment cup or receptacle 11ᶜ which may have a tray or cover as described with reference to Figs. 1–3, and the arm 48 carries a number of vanes 49 inclined at such an angle to the stream flowing over the rim 5ª that they are caused to rotate around the rim and with them the catchment cup 11ᶜ. The catchment cup 11ᶜ has a spout or pipe 50 that extends over a trough 51. It will be seen that by this construction the water is drawn or collected from all points of the circumference of the rim 5ª so that in the event of unevenness in the stream such unevenness will be compensated for.

Obviously various modifications may be made in the manner of carrying this invention into effect without departing from the spirit thereof the above description being given merely by way of example.

What we claim is:—

1. In apparatus of the kind described the combination of means adapted to cause a flowing liquid to assume an even film-like stream, means adapted to intercept said stream whereby the liquid is divided into a plurality of streams the volumes of which bear a constant relation to each other and means whereby the intercepting area of said intercepting means can be varied.

2. In apparatus of the kind described the combination of means adapted to cause a flowing liquid to assume an even film-like stream, a catchment cup adapted to intercept part of said stream and means whereby the intercepting area of the cup presented to the stream can be varied.

3. In apparatus of the kind described the combination of means adapted to cause a flowing liquid to assume an even film-like stream, a catchment cup adapted to intercept part of said stream and means over said cup for varying the receiving area of said cup presented to the stream.

4. In apparatus of the kind described the combination of means adapted to cause a flowing liquid to assume an even film-like stream, a catchment cup adapted to intercept part of said stream, and an adjustable cover over said cup whereby the intercepting area of the opening presented to the stream can be varied.

5. In apparatus of the kind described the combination of a weir, means for adjusting said weir in a horizontal plane whereby a liquid flowing over said weir is caused to assume an even film-like stream, means adapted to intercept part of said stream whereby the liquid is divided into a plurality of streams the volumes of which bear a constant relation to each other and means whereby the intercepting area of said intercepting means can be varied.

6. In apparatus of the kind described the combination of a conical vessel whose sides and edge form a weir, means for adjusting said weir in a horizontal plane, means adapted to deliver liquid into said weir, means adapted to intercept part of a stream of liquid flowing over said weir and means whereby the intercepting area of the intercepting means can be varied.

In witness whereof we have hereunto set our hands in the presence of two subscribing witnesses.

BERTRAND CHASE HINMAN.
ERNEST WILLIAM ROBEY.

Witnesses:
S. HENDERSON,
H. C. WOODCRAFT.

Copies of this patent may be obtained for five cents each, by addressing the " Commissioner of Patents, Washington, D. C."